(12) United States Patent
Bonini et al.

(10) Patent No.: US 6,174,957 B1
(45) Date of Patent: *Jan. 16, 2001

(54) ADHESIVE COMPOSITION BASED ON NOVOLAC

(75) Inventors: Maria Bonini, Gustavsberg; Anna Janackovic, Nacka; Ben Nasli-Bakir, Saltsjö-Boo, all of (SE)

(73) Assignee: Casco Products AB, Stockholm (SE)

( * ) Notice: Under 35 U.S.C. 154(b), the term of this patent shall be extended for 0 days.

This patent is subject to a terminal disclaimer.

(21) Appl. No.: 09/154,048

(22) Filed: Sep. 16, 1998

Related U.S. Application Data

(63) Continuation of application No. 08/761,932, filed on Dec. 9, 1996, now Pat. No. 5,854,339, which is a continuation of application No. 08/325,235, filed on Dec. 12, 1994, now abandoned.

(30) Foreign Application Priority Data

Apr. 24, 1992 (SE) .................................. 92012988

(51) Int. Cl.⁷ ..................................... C08K 5/05
(52) U.S. Cl. ................ 524/595; 524/594; 524/596; 524/611; 528/495
(58) Field of Search ................. 524/595, 594, 524/596, 611; 528/495

(56) References Cited

U.S. PATENT DOCUMENTS

| | | | |
|---|---|---|---|
| 2,350,894 | 4/1944 | Hönel | 528/261 |
| 3,485,797 | 12/1969 | Robins | 526/71 |
| 3,857,815 | 12/1974 | Smith et al. | 525/507 |
| 3,966,658 | 6/1976 | Robitschek et al. | 524/376 |
| 4,156,064 | 5/1979 | Falkenstein et al. | 525/453 |
| 4,197,219 | 4/1980 | Damico | 524/462 |
| 4,368,314 | 1/1983 | Endo et al. | 528/89 |
| 4,608,408 | 8/1986 | Hood et al. | 524/15 |
| 4,968,771 | 11/1990 | Baxter | 528/230 |
| 5,854,339 | * 12/1998 | Bonini et al. | 524/595 |

FOREIGN PATENT DOCUMENTS

| | | |
|---|---|---|
| 49-099190 | 9/1974 | (JP) . |
| 49-112998 | 10/1974 | (JP) . |
| 51-132228 | 11/1976 | (JP) . |
| 53-013674 | 2/1978 | (JP) . |
| 2-127489 | 5/1990 | (JP) . |
| 2-133485 | 5/1990 | (JP) . |
| 3-031384 | 2/1991 | (JP) . |
| 165030 | 3/1986 | (NO) . |
| 408063 | 5/1979 | (SE) . |

* cited by examiner

Primary Examiner—Blaine Copenheaver
Assistant Examiner—John J. Guarriello
(74) Attorney, Agent, or Firm—Burns, Doane, Swecker & Mathis, L.L.P.

(57) ABSTRACT

An adhesive composition based on resorcinol novolac or resorcinol-phenolic novolac contains 35–75% by weight of novolac, less than 25% by weight of water, and 10–40% by weight of an aliphatic divalent, trivalent alcohol. The adhesive composition may also contain up to 20% by weight of filter, based on the amount of novolac, water and alcohol. In a method for preparing the adhesive composition based on resorcinol novolac or resorcinol-phenolic novolac, the novolac is produced by conventional condensation, whereupon an aliphatic divalent, trivalent or tetravalent alcohol is added and water in the novolac is distilled off, resulting in an adhesive composition as defined above. Alternatively, the amount of water can be reduced in the condensation of the novolac to be replaced with an aliphatic divalent, trivalent or tetravalent alcohol.

18 Claims, No Drawings

ADHESIVE COMPOSITION BASED ON NOVOLAC

This application is a continuation, of application Ser. No. 08/761,932, filed Dec. 9, 1996 now U.S. Pat. No. 5,854,339 which is an continuation of application Ser. No. 08/325,235, filed Dec. 12, 1994 abandoned.

The present invention relates to a new adhesive composition based on resorcinol novolac or resorcinol-phenolic novolac. More specifically, the invention concerns a novolac-based adhesive composition containing an aliphatic divalent, trivalent or tetravalent alcohol. The adhesive composition mixed with a hardener has low emission of formaldehyde.

Resorcinol resin and resorcinol-phenolic resin adhesives are commonly used in the wood industry, inter alia because of their satisfactory ageing stability, as well as good water and weather resistance of the glue line. Also, they may readily be cured at room temperature.

Generally, resorcinol resins and resorcinol-phenolic resins are used in the form of novolacs, i.e. precondensates of resorcinol/phenol with formaldehyde, in which the ratio of formaldehyde to resorcinol/phenol is less than 1. The precondensates are cured by further addition of formaldehyde. Since resorcinol is very reactive, a considerable amount of the formaldehyde is added to the resin as curing agent. As a rule, this is done by the user when about to use the resin. It is common that the novolacs are cured with pulverulent curing agents based on paraformaldehyde.

It is well-known that the use of formaldehyde-based adhesives involves the problem of odorous formaldehyde emissions. When the pulverulent paraformaldehyde is dissolved in the precondensate, formaldehyde is released and the adhesive smells. SE 408,063 discloses an attempt to solve this problem by having a curing agent in the form of a suspension of paraformaldehyde in a non-volatile suspending agent. This curing agent does not cause any smell problems when fresh, but when added to the adhesive, the paraformaldehyde reacts with the water in the adhesive mixture, and formaldehyde is released, making the adhesive smell. In attempts to reduce the amount of water in the novolac, viscosity has increased to an unacceptable level, making it impossible to spread the adhesive.

An object of the present invention therefore is to produce an adhesive based on resorcinol novolac or resorcinol-phenolic novolac and having a low emission of formaldehyde after the addition of the formaldehyde based hardener. Another object of the invention is to produce such an adhesive having satisfactory application and gluing properties.

These objects are achieved by an adhesive composition, as defined in the appended claims, which is based on resorcinol novolac or resorcinol-phenolic novolac and is characterized in that it contains 35–75% by weight of novolac, less than 25% by weight of water, and 10–40% by weight of an aliphatic divalent, trivalent or tetravalent alcohol. It was surprisingly found that by reducing the water content in the novolac and replacing it with a divalent, trivalent or tetravalent alcohol, one obtained an adhesive composition which, upon the addition of pulverulent paraformaldehyde, gave off much less formaldehyde smell. The alcohols instead bind the formaldehyde in a larger molecule which does not evaporate and thus does not give off any smell. This molecule is decomposed only at the rate of reaction of the formaldehyde with the resin. Since a divalent, trivalent or tetravalent alcohol is added instead of water, the resulting adhesive will have a viscosity which makes it suitable for spreading. Despite the fact that so much of the water was replaced with the hydroxy compound, the gluing properties of the resin were not impaired, which is highly surprising.

Suitable aliphatic divalent, trivalent or tetravalent alcohols include compounds of the type HO—R1—OH or HO—R1—O—R2—OH, where R1, R2 are (CH2)n, n being $\leq 5$, such as ethylene glycol, diethylene glycol, 1,3-propanediol, 1,3-butanediol, 1,4-butanediol, and various kinds of trivalent and tetravalent alcohols, for instance glycerol and pentaerythritol. The aliphatic divalent, trivalent or tetravalent alcohol should be added in such an amount that the resulting adhesive composition contains 10–40% by weight thereof, preferably 15–30% by weight. Further, the adhesive composition should contain less than 25% by weight of water, preferably less than 20% by weight. Most preferred, the amount of water lies in the range of 5–15% by weight. The amount of novolac in the adhesive composition should be 35–75% by weight, preferably 45–60% by weight. Together, the novolac, the divalent, trivalent or tetravalent alcohol and the water make up 100% by weight of the adhesive composition.

The novolac used in the adhesive composition according to the invention can be produced in conventional manner. The molar ratio of formaldehyde to resorcinol, or of formaldehyde to resorcinol phenol, should be less than 0.9:1. When a mixture of resorcinol phenol is used, the amount of phenol may be up to 80 mole %, preferably 40–60 mole %, based on the total amount of resorcinol and phenol. Conveniently, the pH of the novolac is adjusted to a value in the range of 6.8–8.7. This results in a good balance between formaldehyde emission and curing speed.

The adhesive composition according to the invention may also contain such conventional fillers as olive-stone meal and almond-shell meal or the like in contents of up to $\leq 20\%$ by weight, based on the amount of novolac, alcohol and water.

The adhesive composition can be produced by preparing a novolac by conventional condensation. Then, the desired amount of divalent, trivalent or tetravalent alcohol is added, and water in the novolac is distilled off. Alternatively, the binder can be prepared by reducing the amount of water as early as in the novolac condensation, e.g. by using raw materials of such a low water content that there is no need of any distillation. If so, the alcohol is suitably added at an early stage of the condensation. The viscosity of the resulting binder lies in the range of 300–10,000 mPas, based on a pure resin solution. The adhesive composition is then cured in known manner by adding formaldehyde in an amount giving the binder the desired final molar ratio. Suitably, the final molar ratio in resorcinol/resorcinol-phenolic resins of formaldehyde to resorcinol/resorcinol phenol lies in the range of 0.75–1.7, preferably 0.9–1.2. The formaldehyde is preferably added in the form of a pulverulent curing agent based on paraformaldehyde.

The invention will now be described in more detail below with the aid of the following Examples, in which the figures are in per cent by weight and parts by weight, unless otherwise stated.

EXAMPLE 1

Here, 677 g of phenol, 540 g of formaldehyde (40%), 216 g of water and 21.6 g of NaOH (45%) were added. pH was adjusted to 7.50–8.0.

The mixture was heated to 65° C. and maintained at this temperature for 1 h. Then, the mixture was heated to boiling and allowed to boil for 1.5 h.

The mixture was cooled to 75° C., and 842 g of water, 1584 g of resorcinol and 432 g of formaldehyde (40%) were added. pH was measured, and adjusted with acid to 7.3–7.6 (under cooling). Then, the mixture was again heated to 65° C. and kept at this temperature for 1 h, whereupon it was heated to boiling and condensed to a viscosity of 200 mPas at 25° C., measured according to the Höppler method.

This batch was divided into two parts, in the following referred to as Example 1A and Example 1B.

In Example 1A, pH was adjusted to 7.4, and in Example 1B, pH was adjusted to 8.5. Then, 39 parts by weight and 24 parts by weight, respectively, of ethylene glycol was added to 100 parts by weight of resin in Examples 1A and 1B, and the corresponding amount of water was distilled off. A portion of 1A and a portion of 1B were kept without any glycol added.

The following 6 resin compositions were obtained. The resin content was 56%.

|  | pH | water | ethylene glycol |
|---|---|---|---|
| Example 1A | 7.4 | 5% | 39% |
| " |  | 20% | 24% |
| " |  | 44% | 0% |
| Example 1B | 8.5 | 5% | 39% |
| " |  | 20% | 24% |
| " |  | 44% | 0% |

These six resins were brought to a temperature of 20° C., whereupon paraformaldehyde was added as curing agent (100 parts by weight of resin +6 parts by weight of paraformaldehyde). Immediately after the addition, 8 g was weighed in a dish having a height of 30 mm and a diameter of 50 mm. The dish was then immediately placed under a hood, and air was drawn past the adhesive mixture into a formaldehyde measuring instrument of the type Interscan, air flow 1.1 l/min.

The following emission values for formaldehyde were measured. These values are converted into % of the resin that only contains water as solvent.

|  | pH | Water | 5 | 20 | 44 |
|---|---|---|---|---|---|
|  |  | Ethylene glycol | 39 | 24 | 0 |
| Example 1A | 7.4 |  | 1.2 | 7.6 | 100 |
| Example 1B | 8.5 |  | 10.9 | 58 | 100 |

EXAMPLE 2

Here, 658 g of phenol, 525 g of formaldehyde (40%), 210 g of water and 21 g of NaOH (45%) were added. pH was adjusted to 7.50–8.0. The mixture was heated to 65° C. and kept at this temperature for 1 h. Then, the mixture was heated to boiling and allowed to boil for 1.5 h. The mixture was cooled to 75° C., and 518 g of water, 1925 g of resorcinol and 578 g of formaldehyde (40%) were added. pH was measured and adjusted with acid to 7.7–8.0. Then, the mixture was again heated to 65° C. and kept at this temperature for 1 h. The mixture was thereafter heated to boiling, and condensed to a viscosity of 200 mPas at 25° C., measured according to the Höppler method. The final pH was adjusted to 7.8.

After the pH adjustment to 7.8, the batch was divided into three portions. To portion 2A was added ethylene glycol in an amount of 35 parts by weight and 22 parts by weight, respectively, per 100 parts by weight of resin. To portion 2B was added 1,4-butanediol in an amount of 35 parts by weight and 22 parts by weight, respectively, per 100 parts by weight of resin. The corresponding amount of water was distilled off. Portion 3 was kept unchanged.

Then, the temperature was adjusted and paraformaldehyde was added exactly as in Example 1. Measurements of formaldehyde emission, performed exactly as in Example 1, yielded the following results. The values are converted into % of the resin that only contains water as solvent.

| Water % | 5 | 18 | 5 | 18 | 40 |
|---|---|---|---|---|---|
| Ethylene glycol % | 35 | 22 | 0 | 0 | 0 |
| 1,4-butanediol % | 0 | 0 | 35 | 22 | 0 |
|  | 5.7 | 18 | 12.6 | 31 | 100 |

This Example shows that both ethylene glycol and 1,4-butanediol act as solvents in low-emission adhesives.

EXAMPLE 3

In this Example, adhesive formulations according to Example 1, i.e. containing 100 parts by weight of resin and 6 parts by weight of paraformaldehyde, were used for block gluings under the following conditions.

Kind of wood: Pine

Dimensions: 250×55×22 mm

Glue spread: 300 g/m2

Assembly time closed (TA): about 8 min and about 30 min

Press temperature: 20C

Pressure: 8 bar

Press time: 18 h.

Two glue lines were made for each variable. In the Table below, the results are indicated as % fiber rupture after cutting up the glue lines immediately after the process. Each reported value represents the mean value of two lines.

| Solvent System | | | Fibre Rupture % | |
|---|---|---|---|---|
| Water % | Ethylene glycol % | pH | TA 8 min | TA 30 min |
| 5 | 39 | 7.4 | 20 | 20 |
| 5 | 39 | 8.5 | 65 | 85 |
| 20 | 24 | 7.4 | 30 | 40 |
| 20 | 24 | 8.5 | 80 | 75 |
| 44 | 0 | 7.4 | 5 | 5 |
| 44 | 0 | 8.5 | 75 | 45 |

Obviously, the fiber rupture is as satisfactory when some of the water has been replaced with ethylene glycol.

EXAMPLE 4

In this Example, the gluing operations were performed as in Example 3, but the resin had the same pH (7.8) and different solvents were used. The same resin as in Example 2 was used as adhesive.

| Solvent Water % | Ethylene glycol % | 1,4-butane-diol % | Fibre Rupture % | |
|---|---|---|---|---|
| | | | TA 8 min | TA 30 min |
| 5 | 35 | 0 | 40 | 50 |
| 5 | 0 | 35 | 20 | 15 |
| 18 | 22 | 0 | 35 | 70 |
| 18 | 0 | 22 | 10 | 20 |
| 40 | 0 | 0 | 10 | 30 |

EXAMPLE 5

Also in this Example, the gluing operations were performed as in Examples 3 and 4. The same adhesive and mixtures of curing agents were used as in Examples 3 and 4. Instead of cutting up the glue lines immediately after pressing, a delamination test was made according to American Standard ASTM D1101-59 well-known in the art. Prior to delamination, the samples were conditioned for 1 week at 20 g and 65% RF. Two delamination cycles were run. After measuring the delamination, the glue lines were cut up for an assessment of the fibre rupture.

The results indicated below represent mean values of two glue lines.

| Solvent | | | | Delamination in % | | Fibre rupture % | |
|---|---|---|---|---|---|---|---|
| H2O % | Ethylene glycol % | 1,4-butane-diol % | pH | TA 8 min | TA 30 min | TA 8 min | TA 30 min |
| 5 | 39 | 0 | 7.4 | 0 | 0 | 80 | 25 |
| 20 | 24 | 0 | 7.4 | 32 | 14 | 75 | 45 |
| 44 | 0 | 0 | 7.4 | 3.6 | 0 | 40 | 75 |
| 5 | 39 | 0 | 8.5 | 0 | 0 | 80 | 80 |
| 20 | 24 | 0 | 8.5 | 0 | 0 | 65 | 90 |
| 44 | 0 | 0 | 8.5 | 0 | 0 | 95 | 90 |
| 5 | 0 | 35 | 7.8 | 18 | 0 | 20 | 70 |
| 18 | 0 | 22 | 7.8 | 0 | 45 | 50 | 45 |
| 40 | 0 | 0 | 7.8 | 27 | 60 | 10 | 40 |
| 5 | 35 | 0 | 7.8 | 0 | 0 | 75 | 80 |
| 18 | 22 | 0 | 7.8 | 0 | 0 | 65 | 80 |
| 40 | 0 | 0 | 7.8 | 9 | 0 | 35 | 80 |

As appears from these results, the glue lines are roughly equally good when water is replaced with glycol.

What is claimed is:

1. An adhesive composition based on resorcinol novolac or resorcinol-phenolic novolac, said composition comprising 35–75% by weight of resorcinol novolac or resorcinol-phenolic novolac, less than 25% by weight of water, and 10–40% by weight of an aliphatic divalent, trivalent or tetravalent alcohol.

2. An adhesive composition as claimed in claim 1, wherein the resorcinol novolac or resorcinol-phenolic novolac has a molar ratio of formaldehyde to resorcinol or resorcinol phenol of less than 0.9:1.

3. An adhesive composition as claimed in claim 1, wherein the proportion of phenol is 80 mole % or less of the total amount of resorcinol and phenol.

4. An adhesive composition as claimed in claim 3, wherein the proportion of phenol is 40–60 mole % of the total amount of resorcinol and phenol.

5. An adhesive composition as claimned in claim 1, wherein the viscosity is in the range of 300–10,000 mPas.

6. An adhesive composition as claimed in claim 1, wherein it further comprises 20% or less by weight of filler, based on the amount of resorcinol novolac or resorcinol-phenolic novolac, water and alcohol.

7. An adhesive composition as claimed in claim 1, wherein the divalent alcohol used is ethylene glycol, 1,3-propanediol or 1,4-butanediol.

8. An adhesive composition as claimed in claim 1, wherein the divalent, trivalent or tetravalent alcohol is selected from the group consisting of ethylene glycol, 1,3-propanediol, 1,3-butanediol, 1,4-butanediol, glycerol, and pentaerythritol.

9. An adhesive composition as claimed in claim 1, wherein the divalent alcohol used is ethylene glycol.

10. An adhesive composition as claimed in claim 1, wherein the divalent alcohol used is 1,4-butanediol.

11. A method for preparing an adhesive composition based on resorcinol novolac or resorcinol-phenolic novolac, comprising producing a resorcinol novolac or resorcinol-phenolic novolac by conventional condensation, and then adding an aliphatic divalent, trivalent or tetravalent alcohol and distilling off water in the novolac, such that the adhesive composition comprises 35–75% by weight of resorcinol novolac or resorcinol-phenolic novolac, less than 25% by weight of water, and 10–40% by weight of an aliphatic divalent, trivalent or tetravalent alcohol.

12. Method according to claim 11, wherein the aliphatic divalent, trivalent or tetravalent alcohol is selected from the group consisting of ethylene glycol, 1,3-propanediol, 1,3-butanediol, 1,4-butanediol, glycerol and pentaerythritol.

13. Method according to claim 12, wherein the divalent alcohol is ethylene glycol.

14. Method according to claim 12, wherein the divalent alcohol is 1,4-butanediol.

15. A method for preparing an adhesive composition based on resorcinol novolac or resorcinol-phenolic novolac, comprising reducing the amount of water in the condensation of the resorcinol novolac or resorcinol-phenolic novolac and replacing it with an aliphatic divalent, trivalent or tetravalent alcohol, the resulting adhesive composition comprising 35–75% by weight of resorcinol novolac or resorcinol-phenolic novolac, less than 25% by weight of water, and 10–40% by weight of an aliphatic divalent, trivalent or tetravalent alcohol.

16. Method according to claim 15, wherein the aliphatic divalent, trivalent or tetravalent alcohol is selected from the group consisting of ethylene glycol, 1,3-propanediol, 1,3-butanediol, 1,4-butanediol, glycerol and pentaerythritol.

17. Method according to claim 15, wherein the divalent alcohol is ethylene glycol.

18. Method according to claim 15, wherein the divalent alcohol is 1,4-butanediol.

* * * * *